United States Patent [19]

Michel

[11] Patent Number: 5,066,780

[45] Date of Patent: Nov. 19, 1991

[54] METHOD OF VULCANIZING RUBBER WITH HEAT TRANSFER LIQUID

[75] Inventor: Werner Michel, Emmering, Fed. Rep. of Germany

[73] Assignee: Metzeler GmbH, Munich, Fed. Rep. of Germany

[21] Appl. No.: 420,167

[22] Filed: Oct. 12, 1989

[30] Foreign Application Priority Data

Oct. 12, 1988 [DE] Fed. Rep. of Germany ....... 3834772
Aug. 1, 1989 [DE] Fed. Rep. of Germany ....... 3925482

[51] Int. Cl.$^5$ ............................................. C08C 19/20
[52] U.S. Cl. ..................................... 528/481; 525/343
[58] Field of Search ......................... 528/481; 525/343

[56] References Cited

FOREIGN PATENT DOCUMENTS 3038844  7/1982  Fed. Rep. of Germany .

*Primary Examiner*—Christopher Henderson
*Attorney, Agent, or Firm*—Herbert L. Lerner; Laurence A. Greenberg

[57] ABSTRACT

A heat transfer liquid in the form of a molten salt mixture includes a mixture of potassium nitrate and lithium nitrate, and added calcium nitrate and/or anhydrous salts if appropriate. This is done in order to achieve a low melting point, a low toxicity and in particular a low viscosity. The heat transfer liquid may be used in the vulcanization of rubber.

9 Claims, No Drawings

METHOD OF VULCANIZING RUBBER WITH HEAT TRANSFER LIQUID

BACKGROUND OF THE INVENTION

1. Field of the Invention

The invention relates to a heat transfer liquid being formed of molten potassium nitrate.

Products which are used as a heat transfer liquid, for example in the vulcanization of rubber, must comply with a number of specific properties, such as e.g.:
a) chemical statility in the chosen pressure and temperature range
b) favorable material values (low viscosity, high thermal conductivity and specific heat)
c) low vapor pressure
d) low pour and solidification temperature
e) non-toxic or non-caustic
f) non-corrosive
g) easy to dispose of if unusable.

2. Description of the Related Art

A known heat transfer liquid of a commercially available salt mixture is formed of a ternary mixture of 53 wt.% potassium nitrate, 40 wt.% sodium nitrite and 7 wt.% sodium nitrate and has a melting point of 142° C. However, the sodium nitrite contained therein causes a number of disadvantages. Contact between the molten salt mixture and acid agents, for example carboxylic acids from organic material, leads to the formation of toxic nitrogen oxides, which require particular safety measures. Furthermore, if organic substances come together with sodium nitrite, deflagrations and explosions can occur. Moreover, a reaction of the nitrite with atmospheric oxygen takes place at elevated temperature to form nitrate, which manifests itself in a changed composition of the salt melt, associated with an increase in the melting temperature, and in the end results in the melt being unusable. Finally, because of the considerable toxicity, the disposal of spent nitrite-containing melts present problems and requires transportation to special dumps.

A ternary salt mixture of 44 wt.% calcium nitrate, 44 wt.% potassium nitrate and 12 wt.% sodium nitrate which has a relatively high melting point of 144° C. and a high viscosity, which greatly impedes dripping of the melt from rubber profiles to be vulcanized, for example, is known from German Patent DE-PS 30 38 844.

A ternary salt mixture of 57.6 wt.% potassium nitrate, 16.2 wt.% sodium nitrate and 26.2 wt.% lithium nitrate which is said to have a melting point of 127° C. is furthermore known from British Patent No. 992 418. In that case also, the addition of the sodium nitrate causes an increased viscosity of the melts, which can be a disadvantage in certain processes.

SUMMARY OF THE INVENTION

It is accordingly an object of the invention to provide a heat transfer liquid and a method of vulcanizing rubber therewith, which overcome the herein afore-mentioned disadvantages of the heretofore-known compositions of this general type and which is distinguished by a low melting point and in particular a low viscosity, together with a low toxicity and resulting non-hazardous handling.

With the foregoing and other objects in view there is provided, in accordance with the invention, a heat transfer liquid, comprising molten potassium nitrate with a content of lithium nitrate.

Such a binary mixture has a viscosity of about 25 mPa×s in the temperature range of interest for the melt, compared with about 40 mPa×s for known mixtures according to the abovementioned British patent. This melt is therefore very much thinner and drips very much better, for example in the vulcanization of continuous rubber strands, so that less salt has to be discharged, washed out and recovered. It is furthermore possible to use pumps of lower output for circulation of the melt.

In accordance with another feature of the invention, there is provided an additional content of calcium nitrate. This is done in order to reduce the melting point even further.

In accordance with a further feature of the invention, there are provided anhydrous salts. A commercially available quality of industrial purity of the anhydrous salts is adequate for the envisaged intended use.

In contrast, however, salts can also be used in the solvated form, e.g. as a hydrate, if it is ensured that upon melting the water formed as a foam can evaporate reliably.

In accordance with an added feature of the invention, the content of potassium nitrate in a salt mixture of potassium nitrate and lithium nitrate is preferably 55–80 wt.%, in particular 63–73 wt.%, and that of lithium nitrate 20–45 wt.%, in particular 27–37 wt.%.

In accordance with an additional feature of the invention, the content of calcium nitrate if appropriate is from 0–48 wt.%.

In accordance with yet another feature of the invention, in a ternary mixture with calcium nitrate, the content of lithium nitrate is at least 7 wt.%, and that of potassium nitrate is at least 40 or 46 wt.%.

Melts having a melting point below 150° C. are thus possible in each case.

In accordance with yet a further feature of the invention, there are provided 60 wt.% potassium nitrate, 22 wt.% lithium nitrate and 18 wt.% calcium nitrate in a ternary mixture. Such a mixture has a melting point of only 112° C. coupled with a sufficiently low viscosity and has proved to be particularly advantageous.

The preparation of the heat transfer liquids according to the invention is very simple. As a rule, the individual constituents are mixed by blending in the dry form to yield a premix, followed by melting to yield a homogeneous phase. However, it is also possible and if appropriate technologically expedient to add the individual constituents in portions, without prior blending, to an already liquid melt, in which they then dissolve.

With the objects of the invention in view, there is also provided a method for the vulcanization of rubber, which comprises transferring heat with a heat transfer liquid formed of molten potassium nitrate with a content of lithium nitrate, with possible additions of calcium nitrate and/or anhydrous salts as mentioned above.

Besides their general use in heating baths or as heat transfer agents, the heat transfer liquids according to the invention are employed in particular in the vulcanization of rubber. Continuous strands of rubber profiles are passed through the salt melt, which is usually heated to from 180° C. to 260° C., and in this way vulcanized.

The heat transfer liquids according to the invention are particularly distinguished in this case by their high stability, which is expressed in a long duration of use, their comparatively low toxicity and their safe handling, together with the trouble-free disposal or reprocessing of any residues. The low vapor pressure of the melt is also essential in this case, so that practically no vaporization occurs at temperatures in the working range, that is to say below 250° C.

As a result of the low melting points of these heat transfer liquids, investment and operating costs are reduced since less expenditure for insulation or a lower heating energy requirement is needed to maintain the liquid state. In particular, it is easier to keep the heat transfer medium liquid, even during down times, and this is important since solidified masses can only be re-melted with a great loss of time as a result of the disturbed convection. Moreover, solidification and re-melting lead to shear and pressure stresses on the container walls because of the associated changes in volume, and these are therefore exposed to a greater risk of fracture. The heat transfer liquids according to the invention thus also exhibit advantages in this respect.

Other features which are considered as characteristic for the invention are set forth in the appended claims.

Although the invention is illustrated and described herein as embodied in a heat transfer liquid, it is nevertheless not intended to be limited to the details shown, since various modifications and changes may be made therein without departing from the spirit of the invention and within the scope and range of equivalents of the claims.

The composition and method of preparation of the invention, however, together with additional objects and advantages thereof will be best understood from the following description of some examples of particularly advantageous salt mixtures.

DESCRIPTION OF THE PREFERRED EMBODIMENTS

Example 1:

In each case 27 kg lithium nitrate and 73 kg potassium nitrate are mixed seven times in a drum mixer and introduced into an electrically heated trough, where the mixture is melted to yield a clear melt.

Rubber profiles are vulcanized in this trough at a temperature of 200°–250° C. over several months. After the continuous rubber strand has left the melt, adhering salt residues are washed off with water. The washing solutions are concentrated by vaporization of the water until a salt melt is achieved, and this is pumped back into the heating trough.

Upon cooling of the bath, crystals of potassium nitrate separate out from 165° C., and the melt solidifies at 145° C..

Example 2:

32 wt.% lithium nitrate and 68 wt.% potassium nitrate are mixed with one another and melted as described in example 1. Upon cooling of the melt, crystals separate out from 140° C., and solidification occurs at 133° C. This melt is distinguished by an approximately 20% longer service life in the baths used for vulcanization of rubber.

Example 3:

15 wt.% lithium nitrate, 27 wt.% calcium nitrate and 58 wt.% potassium nitrate are mixed and melted. Upon cooling to 110° C, a supercooled highly viscous melt is formed, which crystallizes after some time. The melting point of the mixture is 123°–125° C.

Example 4:

A melt of 22 wt.% lithium nitrate, 60 wt.% potassium nitrate and 18 wt.% calcium nitrate, after cooling to 100o, is still a clear viscous liquid. This supercooled melt crystallizes after some time at a constant temperature of 107° C. Upon heating to 112° C, the finely crystalline mass melts again to a clear melt.

The last mixture in particular can be kept liquid during production pauses, e.g. over the weekend, and then heated up to the temperature required for the vulcanization when production is resumed with a relatively low expenditure of energy and without any problems emerging.

Overall, binary and ternary systems with melting points which are very much lower than those of the single salts, with a melting point of 337° C. for potassium nitrate, 251° C. for lithium nitrate and 561° C. for calcium nitrate, result. Moreover, the low viscosity which the melts have facilitates dripping from the vulcanized rubber and thus leads to an increase in the rate of production because of the better heat transfer and reduces the washing water requirement.

The International priorities of German Applications P 38 34 772.5, dated Oct. 12, 1989 and P 39 25 482.8, dated Aug. 1, 1989 are being claimed for the instant application. The foregoing is a description corresponding in substance to German Application P 39 25 482.8, dated Aug. 1, 1989 which is hereby made part of this application. Any material discrepancies between the foregoing specification and the latter aforementioned corresponding German application are to be resolved in favor of the latter German application.

I claim:

1. Method of vulcanizing strands of rubber profiles, which comprises:
   preparing a salt melt of potassium nitrate including a content of lithium nitrate and having a viscosity lower than 40 mPa×s,
   heating the salt melt to a temperature substantially between 180° and 260°, and
   continuously passing the strands of rubber profiles through the salt melt and vulcanizing the strands of rubber profiles.

2. Method according to claim 1, which comprises adjusting the melting point of the salt melt to below 150° during the salt melt preparation step.

3. Method according to claim 1, which comprises adjusting the viscosity of the salt melt to approximately 25 mPa×s during the salt melt preparation step.

4. Method according to claim 1, which comprises adjusting the content of potassium nitrate in the salt melt to substantially between 55 and 80% by weight during the salt melt preparation step.

5. Method according to claim 4, which comprises adjusting the content of potassium nitrate in the salt melt to substantially between 63 and 73% by weight.

6. Method according to claim 1, which comprises adjusting the content of lithium nitrate in the salt melt to substantially between 20 and 45% by weight during the salt melt preparation step.

7. Method according o claim 6, which comprises adjusting the content of lithium nitrate in the salt melt to substantially between 27 and 37% by weight.

8. Method according to claim 1, which comprises mixing the individual contents of the salt by blending in dry form for obtaining a premix and melting the premix for obtaining a homogeneous phase.

9. Method according to claim 1, which comprises adding the individual contents to an already liquid melt for dissolving in the preparation step.

* * * * *